Jan. 21, 1969 L. B. LYON 3,422,569
MULCH AND COATED SEED COMPOSITION COMPRISING HUMATES, HEAT
ABSORBENT PARTICLES, BITUMEN, AND AN EMULSIFIER
Filed Aug. 19, 1964

SECTION THROUGH PLANTED ROW

TEMPERATURE
DEPTH
RELATIONSHIP

SECTION THROUGH PLANTED FIELD

SECTION THROUGH CULTIVATED FIELD

SECTION OF
ENCAPSULATED SEED

LLOYD B. LYON, INVENTOR

BY: Piggins & O'Boyle
ATTORNEYS

United States Patent Office 3,422,569
Patented Jan. 21, 1969

3,422,569
MULCH AND COATED SEED COMPOSITION COMPRISING HUMATES, HEAT ABSORBENT PARTICLES, BITUMEN, AND AN EMULSIFIER
Lloyd B. Lyon, Salt Lake City, Utah, assignor to American Hydrocarbon Company, Salt Lake City, Utah, a corporation of Nevada
Filed Aug. 19, 1964, Ser. No. 390,546
U.S. Cl. 47—9     10 Claims
Int. Cl. C05f *11/02*; A01g *7/00*; A01g *13/00*

ABSTRACT OF THE DISCLOSURE

A composition comprising humates, bitumen, an emulsifier, and black particles, such as, carbon black is disclosed. The composition can be used as a mulch or a seed coating.

---

This invention relates to fertilizers and more particularly to humic acid derived fertilizers.

Agriculturalists have long recognized that the growth of plants is dependent on several basic factors. Among these factors, which will vary with the stage of growth of the plant, the most important are heat, water, available nutrients-minerals, carbon dioxide, and sunlight.

Under general agricultural conditions, the availability of sunlight and carbon dioxide is quite adequate and presents no problem in the growth of plants. Even in the most notoriously overcast areas, there is still enough sunlight available to promote the growth of plants. Similarly, our atmosphere provides abundant amounts of carbon dioxide, which is readily available to the growing plants.

Water and nutrients-minerals, however, in many cases have to be supplied artificially. Not only must they be supplied, but they must, of course, be supplied in a form that will be readily available to the plant.

All of the nutrients-minerals needed by plants are not completely known. However, it is known that major and minor amounts of minerals such as iron, manganese, zinc, copper, cobalt, calcium, molybdenum, magnesium, boron, etc. are needed, as well as are the primary soil nutrients of nitrogen, phosphorus and potassium (N, P and K). The last-named N, P and K primary nutrients have heretofore been mostly artificially supplied in the form of inorganic salts. There has been come evidence to show that the application of these inorganic salts to the soil have made the other mentioned minerals unavailable. These minerals are tied up chemically in a form unavailable to plants or much less available, to the plants.

The usefulness of the primary nutrients and minerals has recently been greatly improved by their addition to the soil in organic forms, and more particularly in chelated non-reverting organic forms. It is proposed that a total organic source of primary nutrients and minerals which are non-reverting and totally available for proper and continued plant nutrition be made available in the form of chelated humic acid derivatives and humic acids.

The availability of water has also been greatly improved by the utilization of humic acids and humic acid derivatives, as soil additives. The amount of rainfall alone, is not indicative of the amount of water which is available to plants. In many areas the soil is of such a structure, and the topography is so situated, as to provide very poor water retention, and consequently impair the availability of water to the plants. The utilization of humic acids and their derivatives very much improves the availability of water to plants. These humic acids and their derivatives are hydrophylic colloids which when moistened are transformed into a gel structure of matter serving to retain water in the soil and furthermore to regulate the uptake of water soluble fertilizers and nutrients by the plants, especially at root level. They also tend to retard the leaching of fertilizers and natural soil nutrients even under irrigated conditions.

Of the above five mentioned primary factors affecting the growth of plants, two have been found abundant enough to present no problem, two others have been materially improved by the utilization of humic acids and their derivatives, and the last factor, heat, has heretofore been largely ignored by most agriculturalists. It is therefore the primary purpose of this invention to enhance the availability of the last factor, heat, while at the same time retaining the benefits of water availability and nutrient-mineral availability provided by humic acids and their derivatives.

This invention provides for the use of aqueous suspension-slurries and suspension-sludges of humic acids and humic acid derivatives, emulsifiers, bitumen and inert dark color heat absorbent powders, which are primarily applied as a surface application following seeding, or directly to the seed itself to encase it prior to its being broadcast sown, and also as a side dressing in the cultivation stage of the plant growth.

It is therefore an object of this invention to provide an increase in the temperature of plant seeds in order to cause a shorter germination time period.

An additional object of this invention is to provide an increase in the percent of seed germination.

Another object of this invention is to provide for the increase of the rate of initial and sustained plant growth.

A further object of this invention is to provide a continuous process for the production of humic acids and humic acid derivatives of total organic fertilizer conditioners high in available nutrients and minerals.

Yet another object of this invention is to provide organic fertilizer-soil conditioners high in prolonged releasing nutrients and minerals.

Another object of this invention is to provide for a preferential application of soil additives that will not be hampered by the topography of the soil, wind, or physical composition of the soil.

A still further object of this invention is to provide an increase in the amount of nutrients available and the insurance of optimum utilization of nutrients by plants.

The importance of controlling the primary factors affecting plant growth is becoming more and more recognized by those concerned with proper soil management. The importance of providing heat, as well as the controlled availability and release of primary nutrients and minerals for plant nutrition, as well as the controlled availability of water, is designed to decrease the hazards heretofore associated with our agricultural sector of the economy. When these many factors can be ameliorated, all at the same time, by the advantageous application of already advantageous materials, valuable economic results can be anticipated. Furthermore, it should also be recognized that great economic advantages are possible by the utilization of humic acid and its derivatives as nitrogen bearing fertilizers when compared to the cost of other nitrogen fertilizers such as urea or ammonium nitrate. In addition to the lower initial cost, more savings are obtained by the longer term of availability of nitrogen from humic acid and its derivatives, which is released over a prolonged period of time. Thus, the use of humic acids and their derivatives according to the compositions and methods of this invention will provide a multibeneficial result.

In order to enable a ready comprehension of the principles of the present invention there is shown in the accompanying drawings an illustrative embodiment in which.

Figure 1:
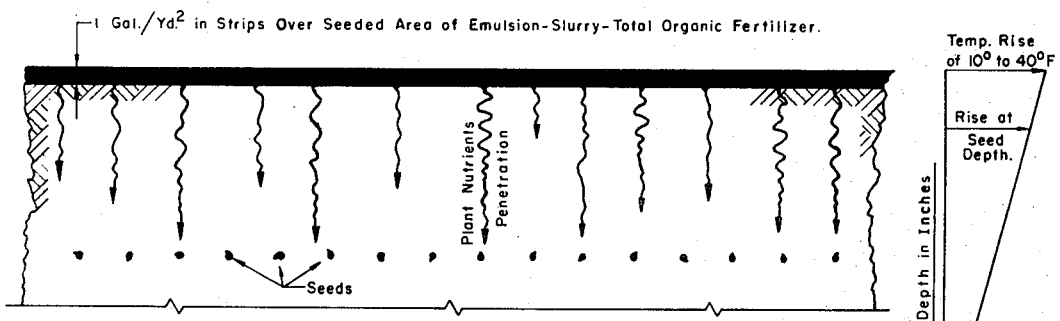
FIGURE 1 is a side view diagram illustrating the relationship between a surface strip of an applied suspension-slurry and the seeds in a planted row.
Figure 2:
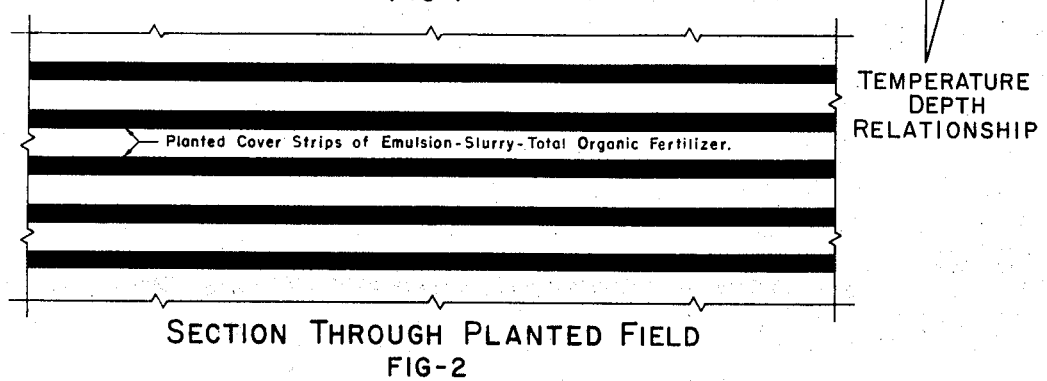
FIGURE 2 is a top view of a planted field illustrating the surface color strips of suspension-slurry over the planted rows of seeds.
Figure 3:
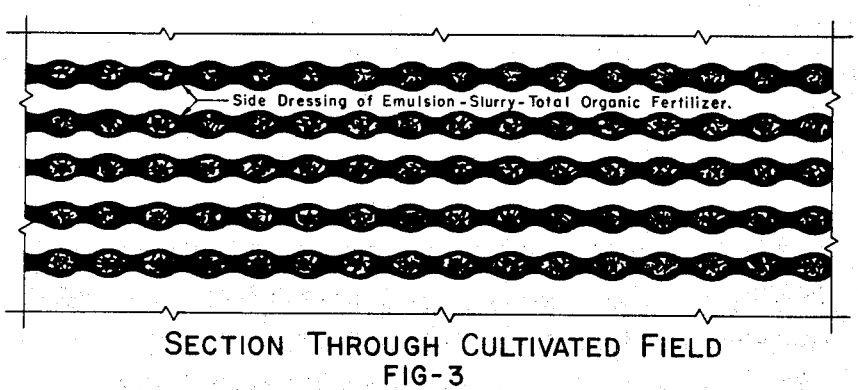
Figure 4:
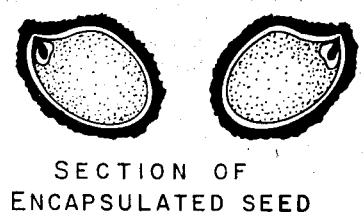

FIGURE 3 is a top view illustrating the side dressing of a suspension-slurry applied to growing plants;

FIGURE 4 is a diagrammatic illustration of the coated seeds.

Very broadly, this invention encompasses the utilization of the organic nutrient-mineral value, hydrophylic water retention and binding properties, and temperature increasing dark color properties of aqueous suspension-slurries and sludges of humic acids and derivatives with emulsifiers, bitumen, and dark heat absorbent inert powders as applied on top of the soil or used directly to encapsulate seeds which are to be broadcast sown on top of the soil.

As is indicated in FIGURE 1, the surface strip of suspension-slurry or sludge is generally from about 1/8 to 1/2 an inch thick and is on top of the soil over the planted seeds. The heated absorption characteristic color of the surface strip increases the surface temperature up to about 40° F. and depending upon the depth to which the seeds have been planted, increases the seed temperature up to about 20° F., tending to accelerate germination. The nutrients in the suspension-slurry or sludge are released at a controlled rate and permeate to the planted seeds by penetration through the soil. Water is similarly held in the gel lattice structure of the suspension at or near the surface and thus is also directly available to the seeds.

FIGURE 2 shows how the suspension-slurry is applied to the surface area of the plant row, and preferably in strips of from about 4 to about 12 inches over the seeded rows. Alternatively, the suspension-slurry may be applied by spraying the entire surface area, as a blanket coating, on fields which have been drill sown and do not contain any rows. In the latter type of application it is recommended that from about 40 to 300 gallons per acre be employed. Although any desired mode of application of the suspension-slurry or sludge may be employed, it has been found that spraying is a most convenient means.

Spraying has also been found to be a convenient mode of application of the suspension-slurry when it is applied as a side dressing on the surface area of the rows around the growing plants as shown in FIGURE 3. This may be applied in amounts of 20 to 200 gallons per acre. Unlike the common inorganic fertilizers, the suspension-slurries or suspension-sludges of this invention may be applied quite closely to the growing plants without burning them or damaging them in any way. This is so because the nutrients are made available to the plants in a prolonged releasing manner and there are no problems of quick leaching and burning of plants encountered when inorganic fertilizers are employed.

Because the material employed is in the form of a suspension-slurry or suspension-sludge, the disadvantages of wasted, blown-away fertilizer, encountered with the application of powdered inorganic fertilizers on windy days will be avoided. Similarly, the disadvantages of wasted, unequally applied fertilizer encountered when liquid inorganic fertilizers are employed on uneven terrain, are likewise avoided. Also avoided, will be the inorganic fertilizer leaching problems, encountered when great amounts of water flow over newly fertilized soil. By following the teachings of this invention, the beneficial factors of the suspension-slurry and suspension-sludge will be made available at the specific desired location, for the longest amount of time, and at the most desirable release levels required by the plant.

Even more direct availability and minimizing of wastes will occur when the suspension-sludge is applied directly to the seed. The thus encapsulated seed may then be dried at low temperatures. Although it is the primary intent to encapsulate seeds which are to be broadcast sown, and thereby benefit from the temperature increase of the dark colored capsule, encapsulated seeds which are planted will, of course, also greatly benefit from this invention. The advantages of having a highly hydrophylic binder providing moisture and at the same time prolonged releasing nutrients directly to the seed and young plant cannot be overemphasized.

Even more beneficial effects occur when the emulsifier employed is a cationic quartenary amine which substantially adheres to the cellulose seed covering thereby effecting a close bond between the seed and the encapsulating material.

The cationic surfactants of choice comprise a group which are nonvolatile and thermally and chemically stable. Typical preferred, although not exclusive members of this group include: diisobutyl phenoxy ethoxy ethyl dimethyl benzyl ammonium chloride ("Hyamine 1622"), methyl dodecyl benzyl trimethyl ammonium chloride ("Hyamine 2389"), diisobutyl cresoxy ethoxy, ethyl dimethyl benzyl ammonium chlroide ("Hyamine 10–X") and octyl phenoxy etohoxy ethyl dimethyl p-chlorobenzyl ammonium chloride ("Hyamine 2744"). These products are produced and sold under the above-designated trade names by Rohm & Haas Company of Philadelphia, Pa.

Preferred wetting agents which may be used alone or in compatable conjunction with the cationic surfactants are water soluble non-ionics of the alkyl aryl polyether aclohol type. A suitable member of this group is marketed under the trade name, "Triton–X 100" by Rohm and Haas. It has also been found that the use of alkyl pyridines and alkyl quinolines containing large organic molecules, hold the suspension mix tenaciously to siliceous sandy soils which even further prevent the leaching of the nutrients. The following emulsifiers are other examples of those which may advantageously be employed: trihydroxyethylamine linoleate, diglycol laurate, glyceryl oleate, aluminum oleate, amidostearyl diethyleneamine, potassium oleate, 2-amino-2-methylol-1, 3-propanediol stearate, potassium palmolate, calcium gluconate, stearyl glutamic acid, potassium caseinate, triethanolamine stearate, ammonium stearate, ammonium laurate, calcium oleate, ammonium oleate, oleic acid, dodecyldiphenyl ether disulfonic acid, tris (hydroxymethyl) aminomethane, etc.

The suspensions of this invention will generally be composed of 50% more water, depending on how it is to be employed. Suspension-sludges designed to encapsulate seeds will generally require less water, whereas more water will be preferred in a suspension-slurry that is designed to be sprayed as a blanket coating over soil which has been drill seeded. Intermediate amounts of water will be found more satisfactory for surface application following seeding when the suspension is applied by spraying to the surface area of planted rows in strips of preferably 4 to 12 inches in width, directly over the seeded row.

The humate portion of the suspensions may come from any convenient humate source, however, I prefer to employ the colloidal humic acids derived by the process described in my copending application, "Humic Acid From Coal Production and Refining Process," Ser. No. 286,114, now abandoned, filed June 6, 1963 of which this present application is a continuation-in-part. This copending application describes the production of humic acids by the controlled catalytic oxidation and hydrolysis of low rank high oxygen-containing coals. My copending application further notes that the use of humic acids promotes the adhesion of asphalts (such as the bitumen portion here employed), and prevents water stripping due to the surface active characteristics of humic acid and its derivatives. These and other properties, such as the hydrophylic properties of the derivative colloids that transform into a gel structure of state, serving to retain water in the soil and to retain the uptake of water soluble fertilizers and nutrients by the plant when moistened, as well as its dark, almost black, color makes these materials unique in their correlation for the purposes of applicant's invention.

In addition to the humates described above, the humate derivatives of my copending application, "Organic Nutrients and Minerals Production and Refining Process," Ser. No. 390,620 filed this same date, now abandoned, provide an excellent source of nitrated and ammoniated derivatives of humic acids as chelatnig, sequestering and complexing agents to provide the organic forms of the basic soil nutrients (N, P and K) and of the major and minor mineral requirements for particular crops such as iron, manganese, zinc, copper, cobalt, calcium, molybdenum, magnesium, boron, etc. This second copending application teaches the formation of metal chelates by the reaction of metal ions in solution with ammonium nitrohumates formed by ammoniating the humic acid colloids formed by a controlled catalytic oxidation and hydrolysis of low rank high oxidation-containing coals. In addition to the ammoniated derivatives, the humic acids may be nitrated to form nitrohumic acids which may subsequently be reacted with phosphoric acid or other sources of $P_2O_5$ to form non-reverting organic phosphates and may also be reacted with basic compounds of potash to form non-reverting organic potash. From the above nitrohumates and their derivatives one can formulate the humate moiety of the suspension according to the specific organic nutrient (N, P and K) and chelated minerals desired in the composition. Not only may the very specific nutrient and mineral composition be selected but the amount of soil nutrients and minerals required to be added for proper soil nutrition can be considerably reduced because they are provided to the soil in chelated non-reverting organic forms. There can now therefore be provided organic forms of non-reverting phosphates, potash and minerals in chelated, sequestered, and complexed forms derived from nitrohumic acid such as ferrous nitrohumate pyrophosphate, potassium nitro humate pyrophosphate, ammonium nitrohumic pyrophosphate, phosphoryl nitrohumic acid, magnesium nitrohumic pyrophosphate, ammonium humate diphosphate and also various phosphates of iron, manganese and metal-containing organic chelates.

The emulsifier employed may be cationic, aniotic, or non-ionic. As has above been indicated, it has been preferred to employ catonic emulsifiers of the alkyl pyridine and alkyl quinoline type such as for instance, benzylquonium chloride, cetylpyridium chloride, etc. These types of emulsifiers, containing large organic molecules, hold the emulsion-slurry mix tenaciously to siliceous sandy soils, which minimizes the leaching of the components, as well as causing adherence to the cellulosic outer shell of the seed. Furthermore, if the emulsifiers are carefully chosen, they may also add to the nutrient value of the suspension-slurry. The type of soil involved may also cause one formulator to prefer a certain type of emulsifier over another. It has generally been found that suspension-slurries and suspension-sludges containing from about 1 to about 5% emulsifiers give very satisfactory results.

Besides the dark color of the humate portion of the suspension, it has been found that an increase of ground or seed temperatures will be enhanced by the addition of more black inert powders such as carbon black or "bug dust" coal fines. These black inert powders which may come from various sources help to form a homogenous dispersed mass of the other ingredients in the suspension and improve the permeabiilty of clayey soils. When the suspension is to be employed right after planting or as seed coating, it has been found that very satisfactory results have been obtained when they are used in amounts of from about 5 to 15%. However, when the suspension-slurries and suspension-sludges are to be employed as a side dressing, after the plant has begun to grow, it has been found that less than 15% of the black inert powders are preferred. Furthermore, when it is desired to more accurately control the temperature factor, various amounts of fly ash, which is white to gray, may be added to specify the temperature increase desired. In this manner, a very accurate control of temperature can be accomplished.

When the suspension is to be employed as a side dressing after the beginning of growth of the plant, it has been found to be preferential to increase the humate portion of the suspension to from about 25% to about 50%.

The bitumen portion of the suspension-slurry and suspension-sludge is preferably a high penetration bitumen, which is a soft asphalt measured by the depth of penetration of a needle dropped into the composition. When the suspension is to be employed as an initial covering right after seed planting, the amount of high penetration bitumen preferred is from about 15% to about 25%. However, when the suspension is to be employed as a side dressing, after the beginning of plant growth, less than 5% of high penetration bitumen has been found desirable. Much greater amounts of bitumen, including major amounts, will be employed when the suspension-sludge is intended as a seed encapsulating material.

The suspension-slurries and suspension-sludges may be prepared in any convenient manner, however, it has been found preferable to first heat the water portion to from about 100° to 180° F., which temperatures insure some viscosity reduction of the bitumen. The emulsifier is then added, followed by the bitumen which has been heated to its flowing temperature. Since high penetration bitumen is used it will have a pourpoint below the temperature of the water. The addition is accomplished by adding the bitumen while the hot solution is in a suitable stir, agitator or mixer and is beaten by paddles, circulated by centrifugal pumps, passed through a colloid mill or disbursed between suitable rotors moving at high velocities. This agitation is continued until complete emulsification has taken place. After suspension has been accomplished the other ingredients may be added while the mixture is still hot or after it has cooled.

A preferable method of preparing the suspensions is by the use of ultrasonic mixing units. Ultrasonic mixing units give better stability to the suspensions by breaking up the bitumen into smaller fluid particles. These ultrasonic mixing units are most preferably ultrasonic transducers of the vortex whistle type, and are more clearly disclosed in my copending application, "Humic Acid From Coal Production and Refining Process," Ser. No. 286,114 filed June 6, 1963, now abandoned, of which this present application is a continuation-in-part, and in my copending application, "Organic Nutrients and Minerals Production and Refining Process," Ser. No. 390,620 filed the same date as this application.

The following examples will generally illustrate particular ways of practicing this invention and are designed to be illustrative only and not limited to the invention:

Example 1

To fifty parts of water heated to about 140° F., were added two parts of the sodium salt of dodecyldiphenyl ether disulfonic acid emulsifier and then 15 parts of high penetration bitumen previously heated to about 140° F. were slowly added with strong, continuing agitation. This mass was then subjected to ultrasonic mixing. The resulting suspension was cooled to room tempearture and to it was added 10 parts per weight of "bug dust" and 23 parts per weight of a mixture of equal parts of colloidal humic acids, potassium nitrohumate pyrophosphate, ammonium nitrohumate pyrophosphate, ferrous nitrohumate pyrophosphate, magnesium nitrohumate pyrophosphate, and ammonium humtae diphosphate. The resulting mass was again subjected to ultrasonic mixing.

The above suspension was applied by spraying to the surface area over planted corn seed in a strip 9 inches wide and having a thickness of one quarter of an inch. The rate of application was about 100 gallons per acre.

Although no other artificial fertilizer was employed, the row treated with the suspension resulted in an earlier germination of an increased yield and quality.

Example 2

To a portion of the above row, at a rate of about 50 gallons per acre, was added as a side dressing a suspension made by heating 50 parts of water to about 140° F. and adding one part by weight of diglycol laurate emulsifier and five parts per weight of the same bitumen of Example 1 heated to about 140° F. while vigorously stirring the mixture. The mass was then subjected to ultrasonic mixing. After cooling to room temperature five parts by weight "bug dust" and 39 parts per weight of humates of the same composition of Example 1 were added while slowly stirring the suspension. The resulting treatment increased the yield of the crop by up to 300% at a fertilizer saving of up to 35%.

*Example 3*

Seeds were encapsulated by placing them in a tumbler with an aqueous suspension made up of 50 parts by weight water, 45 parts by weight of the humates described in Example 1, and 5 parts by weight of the bitumen described in Example 1, and one part by weight of the emulsifier of Example 1.

The thickness of the coating was controlled by regulating the time of treatment. The sludge being adhesive adhered firmly to the surface of the seed. After the seeds were coated and screened they were dried at temperatures below the sterilization temperature of the seed.

Such coated seeds when broadcast sown resulted in a shorter germination time, increased the percent of seed germination, as well as increased the rate of initial and sustained growth of the plants thereby resulting in a materially increased quality and quantity of crop yield.

*Example 4*

Coal containing about 25% oxygen was crushed to 90 mesh and heated to between 150 to 200° F. at pressures ranging from atmospheric to 20 p.s.i.g. The crushed coal was introduced into an oxidizer by a stream of ultrasonic agitated air, together with from about 100 to about 500 parts per million of a catalyst composed of a combination of chlorine and nitric oxide. The oxidizer was operated at 200° F. under a pressure of 20 p.s.i.g. and the ultrasonic energy input in the air stream was .5 kw. per 10 pounds of coal solid entering at a frequency of 22 kc. The above was subjected to a hydrolysis reaction by mineral acids wherein the acid to solids ratio was 4 to 1 and the mineral acid employed was nitric acid. It was noticed that some hydrochloric and nitrous acid was formed from the hydrolysis and oxidation of the volatile catalyst upon its removal from the coal fragments. Agitation was controlled by the injection of air. The secondary oxidation in the liquid reactive system was accelerated by the addition of 1% hydrogen peroxide. The hydrolyzing solution was controlled so that the composition was about 80 to 90% nitric acid, 5 to 10% hydrochloric acid and 5% miscellaneous mineral and organic acid breakdown products formed in the system. The solvent used was a dilute solution of hydrochloric acid. The resultant conversion of the coal to humic acid was 85% with 5% unconverted and 10% ash. The product produced resulted as nitrohumic acid.

*Example 5*

A portion of the humate formed in Example 4 along with other humic acid derivatives in the form of a slurry was reacted with anhydrous ammonia. Resultant from this reaction were ammonium nitrohumates.

*Example 6*

An industrial waste solution containing 2% metals in solution was reacted with 50% nitrohumic acid. The resultant metal chelates formed contained 50% inorganic materials of which 20% were metals of the metal solution.

*Example 7*

A slurry of nitrohumic acids and chelated iron was reacted with a 76% acid solution composed of pyrophosphoric acid and orthophosphoric acid. The resultant slurry contained 50% nitrohumic acid, 5 to 20% chelated iron and 30 to 45% phosphoric acid containing 76% acid.

*Example 8*

The ultimate analysis for organic fertilizers produced and blended from nitrohumic acid produced by the above examples commonly resulted in a 10–10–4 to 12–12–6 N, P and K content wherein further analysis showed carbon at 35–40%, oxygen 40–45%, nitrogen 10–12%, phosphorous 4.5–5.5%, potassium 3–5%, and iron and other trace minerals 1–2%. These organic fertilizers had two to five times the plant availability of non-reverting phosphate and potash as a 12–20–10 inorganic formulation after two weeks in low organic soils, and had over 50 times the availability of iron and trace minerals than the high concentrate ferric sulphates and sulphated trace minerals generally added to mineral deficient soils. The nitrogen was shown to be of the slow release type.

While details of the invention have been disclosed, it is recognized that changes and modifications may be made therein without departing from the spirit and scope of the invention which is not intended to be limited except as defined in the appendent claims.

What is claimed is:

1. An encapsulated seed product comprising a plant seed having firmly adhered thereto a continuous enveloping coating of, by weight, about 20 to 50% humates, at least about 15% bitumen, about 5 to 15% inert heat absorbent particles and about 1 to 5% emulsifier.

2. The product of claim 1 wherein the inert heat absorbent particles comprise coal fines.

3. The product of claim 1 wherein the inert heat absorbent particles comprise carbon black.

4. A process for improving the germination of seeds which comprises encapsulating the seed with a coating of a composition including, by weight, about 20 to 50% humates, at least about 15% bitumen, about 5 to 15% inert heat absorbent particles and 1 to 5% emulsifier.

5. An aqueous suspension comprising at least 50% water, 15 to 25% humates, 15 to 25% high penetration bitumen, 5 to 15% inert fine black particles, and 1 to 5% emulsifier.

6. The composition of claim 5 wherein the humates are selected from the group consisting of humic acid, nitrohumic acid, ammonium nitrohumate and their respective metal chelates.

7. The suspension of claim 5 wherein the inert fine black particles comprise coal fines.

8. The suspension of claim 5 wherein the inert fine black particles comprise carbon black.

9. The composition of claim 5 wherein the emulsifier is a cationic emulsifier composed of an organic material which has plant nutritive value.

10. The composition of claim 5 wherein the emulsifier is selected from the group consisting of alkyl pyridines, and alkyl quinolines.

References Cited

UNITED STATES PATENTS

| | | | |
|---|---|---|---|
| 3,164,925 | 1/1965 | Harshman et al. | 47—9 |
| 3,036,015 | 5/1962 | Woodward. | |
| 2,916,853 | 12/1959 | Latourette et al. | 71—24 |
| 1,882,377 | 10/1932 | Whittelsey | 47—9 |
| 1,864,672 | 6/1932 | Rose et al. | 47—9 |
| 2,992,093 | 7/1961 | Burdick | 71—24 |

FOREIGN PATENTS 711,623   7/1954   Great Britain.

DONALL H. SYLVESTER, *Primary Examiner.*

R. D. BAJEFSKY, *Assistant Examiner.*

U.S. Cl. X.R.

47—57.6; 71—24, 64